(12) United States Patent
Takamiya

(10) Patent No.: US 8,724,133 B2
(45) Date of Patent: May 13, 2014

(54) IMAGE FORMING APPARATUS, CONTROL METHOD OF THE IMAGE FORMING APPARATUS, AND RECORDING MEDIUM

(75) Inventor: Hiroyoshi Takamiya, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 13/301,037

(22) Filed: Nov. 21, 2011

(65) Prior Publication Data

US 2012/0162702 A1    Jun. 28, 2012

(30) Foreign Application Priority Data

Dec. 22, 2010  (JP) ................................ 2010-286536

(51) Int. Cl.
*G06F 3/12*    (2006.01)
(52) U.S. Cl.
USPC .......................... 358/1.14; 358/1.13; 358/1.15
(58) Field of Classification Search
USPC ............ 358/1.9, 1.13, 1.14, 1.15, 1.16, 1.17, 358/1.18; 399/81, 82, 86, 363, 386, 387, 399/394
See application file for complete search history.

(56) References Cited

U.S. PATENT DOCUMENTS

2005/0179914 A1*  8/2005  Fuse ............................... 358/1.2
2006/0285143 A1* 12/2006  Han et al. ..................... 358/1.13
2007/0013790 A1*  1/2007  Nakase ..................... 348/231.99
2009/0009806 A1*  1/2009  Matsuda ...................... 358/1.15
2009/0040561 A1*  2/2009  Sasaki ......................... 358/1.18

FOREIGN PATENT DOCUMENTS

| CN | 1655070 A | 8/2005 |
| CN | 101335804 A | 12/2008 |
| JP | 2002-271602 A | 9/2002 |
| JP | 2005-227588 A | 8/2005 |
| JP | 2007-060033 A | 3/2007 |
| JP | 2009-009234 A | 1/2009 |

* cited by examiner

*Primary Examiner* — Dennis Dicker
(74) *Attorney, Agent, or Firm* — Canon USA, Inc., IP Division

(57) ABSTRACT

An image forming apparatus may include a reading unit, a display unit, and a printing unit. The reading unit reads a document and generate image data. The display unit displays a screen for setting a layout in printing the image data. The printing unit prints the image data using the layout and a read size of the document. In response to a screen for setting a layout in printing the image data being displayed by using a certain method, a user of the displaying unit is allowed to skip setting of the read size of the document to print the image data. In response to a screen for setting a layout in printing the image data being displayed without using the certain method, the user is requested to set the read size of the document to print the image data.

15 Claims, 5 Drawing Sheets

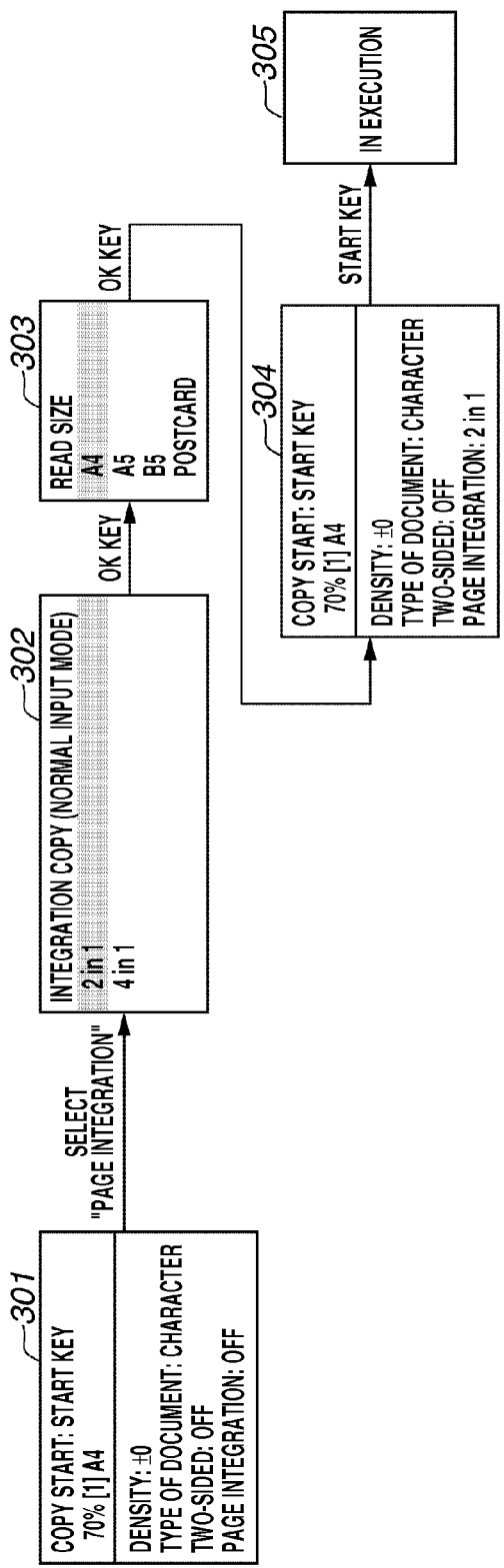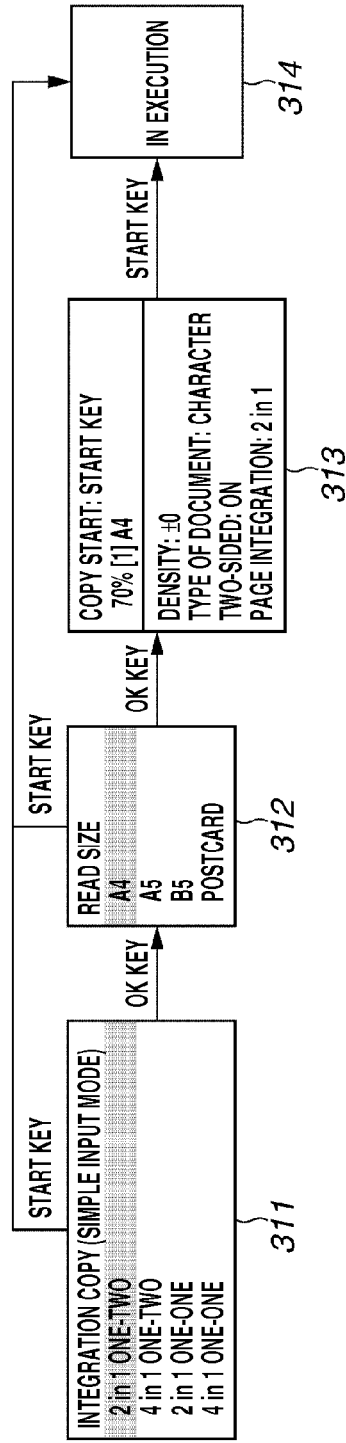

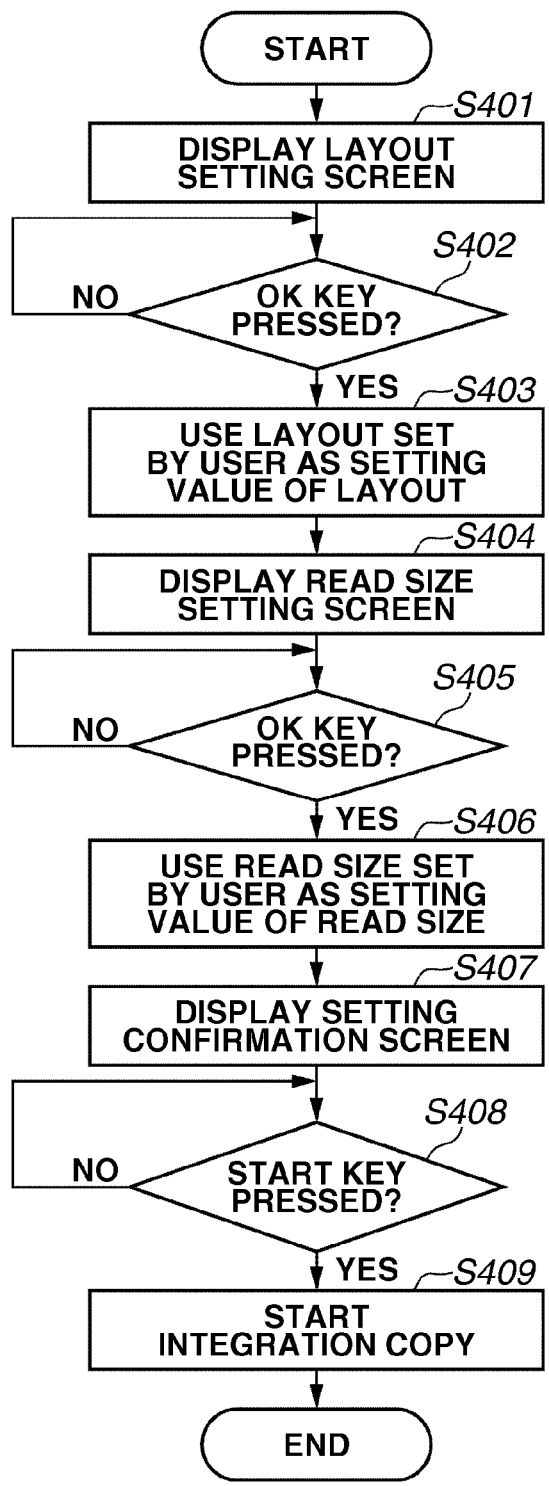

IMAGE FORMING APPARATUS, CONTROL METHOD OF THE IMAGE FORMING APPARATUS, AND RECORDING MEDIUM

BACKGROUND OF THE INVENTION

1. Field of the Invention

The present invention relates to an image forming apparatus, a method for controlling the image forming apparatus, and a recording medium.

2. Description of the Related Art

Conventionally, image forming apparatuses such as printers having a copy function have been known. Some of the image forming apparatuses include a shortcut key. Using the shortcut key, a user can easily display a certain screen for executing a function. The system that employs the shortcut key of an image forming apparatus includes a method discussed in Japanese Patent Application Laid-Open No. 2009-009234.

In Japanese Patent Application Laid-Open No. 2009-009234, the image forming apparatus includes two shortcut keys. A user can assign setting items (for example, a magnification and a color of image) to the two shortcut keys. As described above, for example, by assigning a setting item that is frequently used to a shortcut key, the user can easily display a setting screen for setting the setting item on the image forming apparatus.

However, the above-described known technique includes the following problems. For example, it is assumed that an integration copy function is assigned to a shortcut key in order to use the integration copy function for reducing the sizes of images on a plurality of documents by laying out the images on a sheet of paper and printing the images. By using the shortcut key, a setting screen for the integration copy can be easily displayed. However, in order to actually execute the integration copy, input operations for setting items by the user such as settings for the layout and the reading size of the document by operation keys are required.

SUMMARY OF THE INVENTION

The present invention is directed to an image forming apparatus and a method for controlling the image forming apparatus capable of reducing user's input operations of a setting item for performing a function provided in the image forming apparatus.

According to an aspect of the present invention, an image forming apparatus includes: a reading unit configured to read a document and generate image data, a display unit configured to display a screen for setting a layout in printing the image data, and a printing unit configured to print the image data using the layout and a read size of the document, wherein, in response to a screen for setting a layout in printing the image data being displayed by using a certain method, a user of the displaying unit is allowed to skip setting of the read size of the document to print the image data, and in response to a screen for setting a layout in printing the image data being displayed without using the certain method, the user is requested to set the read size of the document to print the image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate flows of operation screens according to the first exemplary embodiment.

FIG. 4 is a flowchart illustrating a processing procedure for performing integration copy in a normal input mode according to the first exemplary embodiment.

DESCRIPTION OF THE EMBODIMENTS

Various exemplary embodiments, features, and aspects of the invention will be described in detail below with reference to the drawings.

Figure 1:
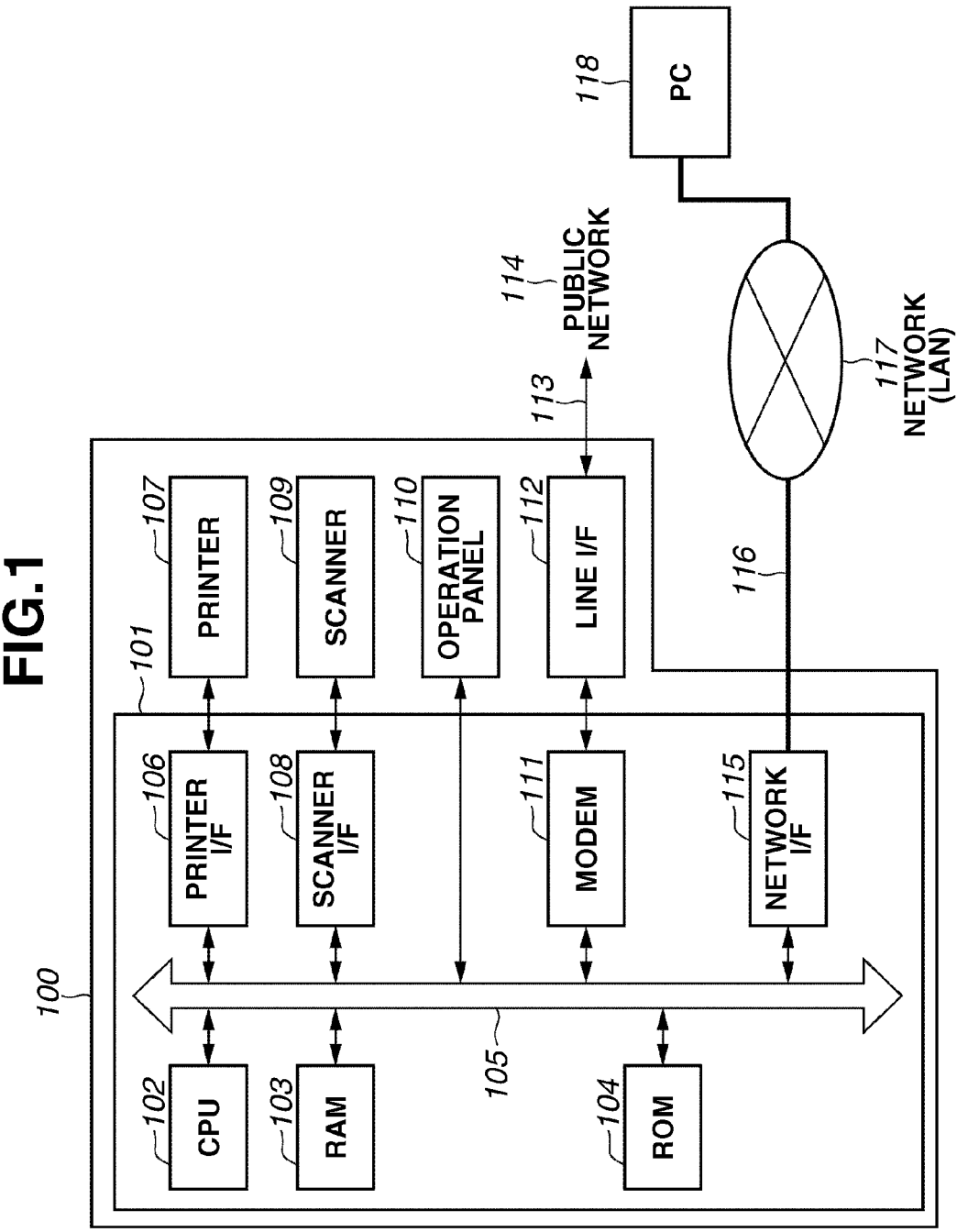
FIG. 1 is a block diagram illustrating a configuration of an image forming apparatus according to a first exemplary embodiment.

FIG. 1 is a block diagram illustrating a hardware configuration of an image forming apparatus according to a first exemplary embodiment.

An image forming apparatus 100 includes a printer 107, a scanner 109, an operation panel 110, a line interface (I/F) 112, and a controller 101 that controls these elements. The image forming apparatus according to the present exemplary embodiment is a multi function peripheral (MFP) that includes functions of devices such as a scanner, a printer, a facsimile machine, a network transmission device, and the like in one housing. The image forming apparatus according to the present exemplary embodiment is not limited to the MFP and, for example, a printer having a copy function can be employed.

The controller unit 101 includes a central processing unit (CPU) 102, a random access memory (RAM) 103, a read-only memory (ROM) 104, a printer I/F 106, a scanner I/F 108, a MODEM 111, and a network I/F 115. These blocks are connected with each other via a system bus 105.

The CPU 102 reads a control program stored in the ROM 104 or a hard disk drive (HDD) (not illustrated), and performs overall control of the apparatus. The RAM 103 serves as a temporary region for a main memory, a work area, or the like of the CPU 102. The ROM 104 stores information, for example, a control program for performing processing relating to each flowchart described below.

The network I/F 115 performs communication processing with a host computer (in the drawing, expressed as PC (personal computer), and hereinafter, referred to as PC 118) via a network (LAN—local area network) 117 or the like. The network I/F 115 and the network 117 are connected with each other using a communication cable such as a local area network (LAN) cable 116.

The line I/F 112 is an interface for connecting the MODEM 111 and a public network 114. The MODEM 111 is connected with the public network 114 via the line I/F 112. The MODEM 111 performs communication processing with another image forming apparatus, a facsimile machine, a telephone, or the like (not illustrated). Generally, the line I/F 112 and the public network 114 are connected via a telephone line 113, or the like.

The printer I/F 106 is an interface for outputting an image signal to the printer 107. The scanner I/F 108 is an interface for inputting a read image signal from the scanner 109. The CPU 102 processes the image signal input from the scanner 109 via the scanner I/F 108, and outputs the signal as a record image signal to the printer 107 via the printer I/F 106.

By the operation, the image data generated by reading a document by the scanner 109 is printed by the printer 107. In the present exemplary embodiment, the scanner 109 does not include a function for detecting the size of the document. However, the present invention is not limited thereto and the scanner 109 may include a function for detecting the size of the document.

The operation panel 110 includes a display unit. The operation panel 110 can display information such as characters and symbols. The information displayed on the operation panel 110 such as the characters and the symbols are displayed by the CPU 102 using font information or the like stored in the ROM 104. The operation panel 110 is operated by a user, and the CPU 102 receives the instruction content by the operation of the user from the operation panel 110. The operation panel 110 is described in detail below with reference to FIG. 2.

In the present exemplary embodiment, the printer 107 and the scanner 109 are provided in the image forming apparatus 100. However, one of or both of the printer 107 and the scanner 109 can be provided outside the image forming apparatus 100.

Figure 2:
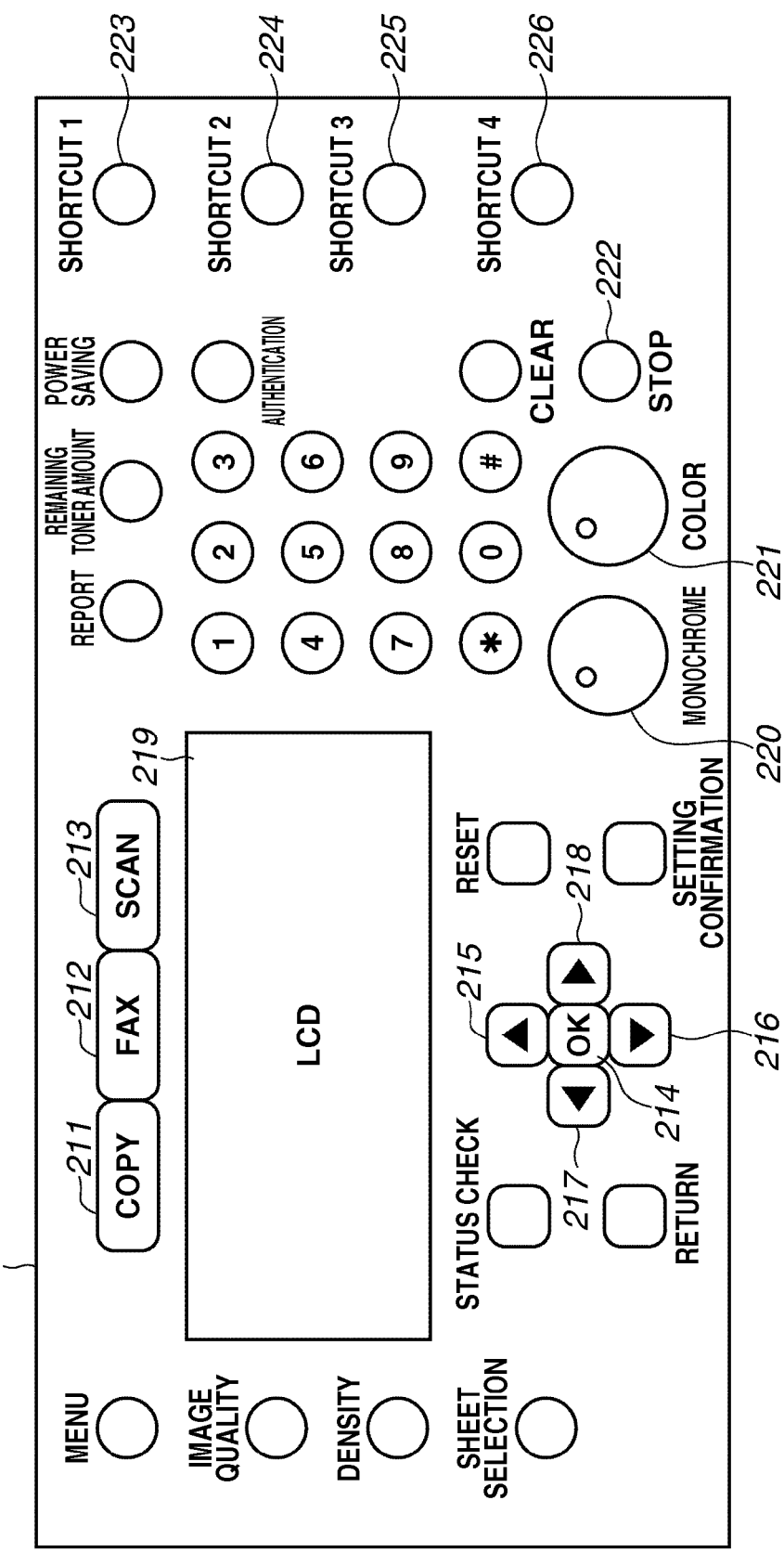
FIG. 2 illustrates a configuration of an operation panel according to the first exemplary embodiment.

FIG. 2 illustrates the operation panel 110. The operation panel 110 includes a liquid crystal display (LCD) 219 that serves as a display unit and various types of input keys.

The LCD 219 serves as the display unit, and performs display of an operation screen. Specifically, the LCD 219 can display various types of operation screens in FIG. 3 described below. The LCD 219 can include a touch panel function. In such a case, an instruction content by the operation of the user can be transmitted to the CPU 102.

Input keys 211, 212, and 213 are pressed when the user uses functions of "copy", "facsimile", and "scan" provided in the image forming apparatus 100. In response to pressing operation of one of the input keys 211 to 213 by the user, a basic screen for performing the corresponding function is displayed.

Further, in response to the pressing operation of one of the input keys 211 to 213 by the user, the corresponding input key lights up. By the operation, the user can easily check which input key is pressed.

An input key 214 is an OK key. The user can select and determine a desired setting item from a plurality of setting items, or input and determine a setting item by pressing the input key 214. Input keys 215, 216, 217, and 218 are arrow keys, and used to select a setting item by the user.

An input key 220 is a start key (monochrome). For example, an image read by the scanner 109 is printed not in color but in monochrome by the printer 107. Similarly, an input key 221 is a start key (color). For example, an image read by the scanner 109 is printed not in monochrome but in color by the printer 107 in response to input key 221 being pressed.

An input key 222 is a stop key, and used to stop execution of a function provided in the image forming apparatus. Input keys 223, 224, 225, and 226 are shortcut keys. To each of the input keys 223 to 226, a specific function that is frequently used is assigned.

The hardware configuration in the present exemplary embodiment is described above. Now, a flow of processing in the present exemplary embodiment will be described.

In the present exemplary embodiment, the image forming apparatus 100 provides, as one of the copy functions, an integration copy function. Using the integration copy function, the user can perform "2 in 1 copy" for arranging images of two documents on one sheet of paper and copying the documents, or "4 in 1 copy" for arranging images of four documents on one sheet of paper and copying the documents.

Further, as an input method of a setting item necessary for the integration copy, the user can use two input methods of a normal input mode and a simple input mode. A feature of the integration copy in the simple input mode is that input operation of a setting item necessary for the integration copy can be omitted. By the feature, in the integration copy in the simple input mode, the input operation of the setting item by the user can be reduced as compared to the integration copy in the normal input mode, which may require input operation of a setting item necessary for the integration copy.

Depending on the purpose, the user can switch the integration copy in the normal input mode and the integration copy in the simple input mode, and perform the integration copy.

FIG. 3A illustrates a flow of operation screens in performing the integration copy in the normal input mode by the user. Operation screens 301 to 305 are displayed on the LCD 219. The arrows illustrate transition of the operation screens.

If the user presses the input key 211 to use the copy function, the operation screen 301 that is a basic screen for the copy function is displayed. On the operation screen 301, setting items for performing the copy function are displayed. An item "page integration" is for setting a layout such as "2 in 1 copy" or "4 in 1 copy".

The setting items displayed on the operation screen 301 can be various items, and the setting items are not limited to the setting items in the present exemplary embodiment. If the display area of the LCD 219 is not large enough, the user can check all setting items by scrolling the operation screen 301 by pressing the arrow keys (the input keys 215 to 218).

On the operation screen 301, if the user selects the item "page integration" using the arrow keys (the input keys 215 to 218) and presses the OK key (the input key 214), the operation screen 302 is displayed. The operation screen 302 is for setting a layout such as "2 in 1 copy" or "4 in 1 copy". By pressing the arrow keys (the input keys 215 to 218), the user can select a desired layout.

If the user selects a desired layout on the operation screen 302 and presses the OK key (the input key 214), the operation screen 303 is displayed. On the operation screen 303, the user sets a read size of the document. As described above, the scanner 109 does not include the function for detecting the size of the document. Consequently, in performing "2 in 1 copy" or "4 in 1 copy", in order to arrange the image in the document for an appropriate layout, the user is required to set the size of the document.

If the user selects a read size of the document on the operation screen 303, and presses the OK key (the input key 214), the operation screen 304 is displayed. The operation screen 304 is a basic screen for the copy function similar to the operation screen 301. The operation screen 304 is used also as a setting confirmation screen for checking the settings of the copy.

If the user further wants to perform setting for performing the copy, for example, setting for two-sided copy, the user selects "two-sided" using the arrow keys (the input keys 215 to 218) and presses the OK key (the input key 214). Then, a setting screen (not illustrated) for the two-sided copy is displayed.

If the user checks the settings and presses the start key (the input key 220 or 221), the integration copy is started, and the operation screen 305 indicating that the integration copy is in execution is displayed.

In performing the integration copy in the normal input mode, even if the user presses the start key (the input key 220 or 221) during the setting (for example, the operation screen 302 or 303) for performing the integration copy, the integration copy is not started. The processing is for the user to make sure that the user inputs the setting items necessary for performing the integration copy and confirms the settings.

As described above, the user can check the input of the setting items necessary for performing the integration copy and confirm the settings. Accordingly, the user can surely obtain the intended print result.

Meanwhile, the user may want to omit the input of the setting items the user is required to perform and finish the input operation soon or simplify the input operation. The function responding to the request is the integration copy in the simple input mode. FIG. 3B illustrates a flow of operation screens in performing the integration copy in the simple input mode by the user. Operation screens 311 to 314 are displayed on the LCD 219. The arrows indicate transfer of the operation screens.

If the user starts the integration copy in the simple input mode, first, the operation screen 311 is displayed. The operation screen 311 is for setting a layout such as "2 in 1 copy" or "4 in 1 copy". In the present exemplary embodiment, in order to display the operation screen 311, a shortcut key (for example, the input key 226) provided for the integration copy in the simple input mode is to be pressed.

By the operation, in performing the integration copy in the simple input mode, the number of input operations of the user necessary for displaying the operation screen for setting the layout can be reduced as compared to performing the integration copy in the normal input mode.

In the operation screen 311, the item. "one-two" means to read a one-sided document, and perform two-sided copy, and the item "one-one" means to read a one-sided document and perform one-sided copy. Setting for two-sided copy can be simultaneously performed on the operation screen 311. By the processing, in performing the integration copy in the simple input mode, the input operation of the user necessary for performing the setting for the two-sided copy can be reduced as compared to performing the integration copy in the normal input mode.

If the user selects a desired layout and presses the start key (the input key 220 or 221) on the operation screen 311, the integration copy is started, and the operation screen 314 indicating that the integration copy is in execution is displayed. In the processing, setting of the read size of the document is not performed, and a predetermined default value (for example, A4) set to the image forming apparatus 100 is to be used.

The default value can be set to any value by the user, or the default value can be set to the image forming apparatus 100 in advance and cannot be changed by the user. Further, a size set in a previous processing can be set as the default value, or sizes set so far are stored, and in the stored values, a frequently used size can be set as the default value.

In the present exemplary embodiment, the scanner 109 does not include the function for detecting the size of the read document. However, if the scanner 109 has the function for detecting the size of the read document, the following setting can be used. That is, the size of the document detected by the scanner 109 can be used as the predetermined default value set to the image forming apparatus 100.

If the user selects a desired layout on the operation screen 311 and presses the OK key (the input key 214), the operation screen 312 is displayed. On the operation screen 312, the user sets the read size of the document similar to the case of the operation screen 303.

If the user sets the read size of the document and presses the start key (the input key 220 or 221) on the operation screen 312, the integration copy is started, and the operation screen 314 indicating that the integration copy is in execution is displayed.

If the user selects the size of the document on the operation screen 312 and presses the OK key (the input key 214), the operation screen 313 is displayed. The operation screen 313 is a basic screen for the copy function similar to the operation screen 301. The operation screen 313 is used also as a setting confirmation screen for checking the settings of the copy by the user.

If the user checks the settings and presses the start key (the input key 220 or 221) on the operation screen 313, the integration copy is started, and the operation screen 314 indicating that the integration copy is in execution is displayed. If the user further wants to perform setting, the user can select an item to be set on the operation screen 313, and perform the setting.

On the operation screen 311 or the operation screen 312, in order to notify the user that the integration copy can be performed if the user presses the start key (the input key 220 or 221), the information can be a displayed on a status bar (not illustrated). Alternatively, a light-emitting diode (LED) (not illustrated) provided for the start key (the input key 221 or 222) can be lighted to notify the user that the integration copy can be performed.

As described above, in performing the integration copy in the simple input mode, even if the user presses the start key (the input key 220 or 221) during the setting (for example, the operation screen 311 or 312) for performing the integration copy, the integration copy can be performed.

Especially, in the case where the start key (the input key 220 or 221) is pressed on the operation screen 311, even if a setting item (in the present exemplary embodiment, the read size of the document) to be set on the subsequent operation screen is not set by the user, the integration copy can be performed.

For the user, the input of the setting item (in the present exemplary embodiment, the read size of the document) necessary for the integration copy can be omitted, and consequently, the input operation of the setting item to be performed by the user can be reduced.

Further, in performing the integration copy, the user can switch the normal input mode and the simple input mode in the integration copy depending on the purpose. If the user surely wants to obtain an intended printing result, the user can perform the integration copy in the normal input mode in which the input operation of the setting item necessary for the integration copy and the checking operation of the settings cannot be omitted.

Meanwhile, if the user wants to omit the input operation of the setting item and finish the input operation soon, or wants to simplify the input operation, the user can perform the integration copy in the simple input mode.

FIG. 4 is a flowchart illustrating a processing procedure in performing the integration copy in the normal input mode by the user according to the present exemplary embodiment. Each step in steps S401 to S409 is performed by the CPU 102 provided in the image forming apparatus 100 by loading a program stored in a memory such as the ROM 104 in the RAM 103 and executing the program. According to the program, the CPU 102 controls each unit illustrated in FIG. 1.

If the user presses the input key 211 to use the copy function, the LCD 219 displays the operation screen 301 that is the basic screen for the copy function. On the operation screen 301, if the user selects the item "page integration" using the arrow keys (the input keys 215 to 218), in step S401, the LCD 219 displays the layout setting screen (the operation screen 302). On the layout setting screen (the operation screen 302), the user can select a desired layout.

In step S402, the CPU 102 determines whether the OK key (the input key 214) is pressed by the user. If the CPU 102 determines that the OK key (the input key 214) is not pressed by the user (NOT in step S402), the processing returns to step S402. If the CPU 102 determines that the OK key (the input key 214) is pressed by the user (YES in step S402), the processing proceeds to step S403. In step S403, the layout selected by the user on the layout setting screen (the operation screen 302) is set as the setting value of the layout. In this step, even if the user presses the start key (the input key 220 or 221), the integration copy is not started.

In step S404, the LCD 219 displays the read size setting screen (the operation screen 303). On the read size setting screen (the operation screen 303), the user can select a read size of the document.

In step S405, the CPU 102 determines whether the OK key (the input key 214) is pressed by the user. If the CPU 102 determines that the OK key (the input key 214) is not pressed by the user (NO in step S405), the processing returns to step S405. If the CPU 102 determines that the OK key (the input key 214) is pressed by the user (YES in step S405), the processing proceeds to step S406. In step S406, the read size selected by the user on the read size setting screen (the operation screen 303) is set as the setting value of the read size.

In this step, even if the user presses the start key (the input key 221 or 222), the integration copy is not started.

In step S407, the LCD 219 displays the setting size confirmation screen (the operation screen 304). In step S408, the CPU 102 determines whether the start key (the input key 220 or 221) is pressed by the user.

If the CPU 102 determines that the start key (the input key 220 or 221) is not pressed by the user (NO in step S408), the processing returns to step S408. If the CPU 102 determines that the start key (the input key 220 or 221) is pressed by the user (YES in step S408), the processing proceeds to step S409. In step S409, according the set layout and read size, and the size of paper of an output destination, the integration copy is started.

In the present exemplary embodiment, the size of the paper of the output destination is determined based on the size of the paper set in a sheet cassette (not illustrated) by setting the predetermined sheet cassette to be used by the user.

Figure 5:
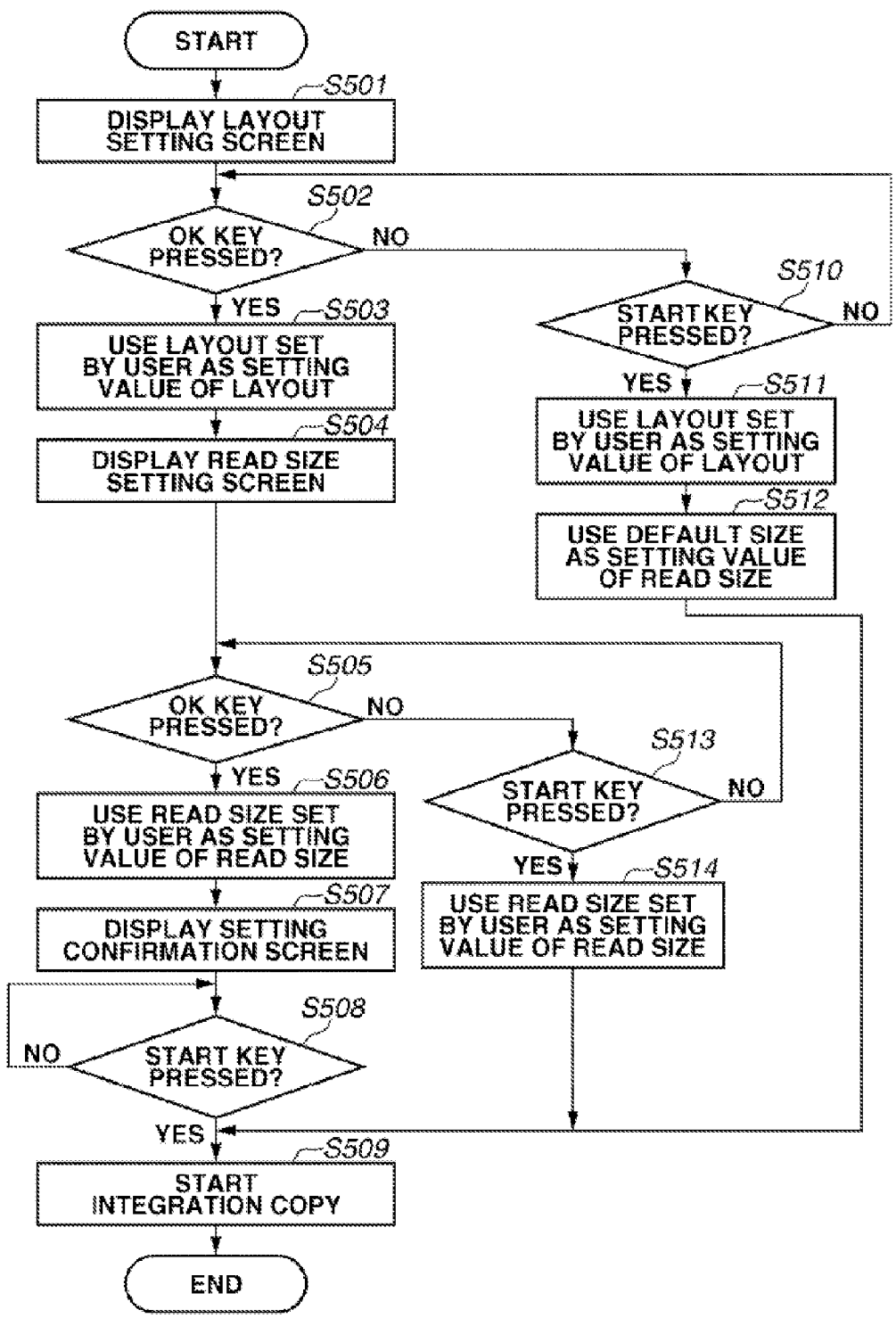
FIG. 5 is a flowchart illustrating a processing procedure for performing the integration copy in a simple input mode according to the first exemplary embodiment.

FIG. 5 is a flowchart illustrating a processing procedure in performing the integration copy in the simple input mode by the user according to the present exemplary embodiment. Each step in steps S501 to S514 is performed by the CPU 102 provided in the image forming apparatus 100 by loading a program stored in a memory such as the ROM 104 into the RAM 103 and executing the program. According to the program, the CPU 102 controls each unit illustrated in FIG. 1.

If the user presses a shortcut key (for example, the input key 226) provided for the integration copy in the simple input mode, in step S501, the LCD 219 displays the layout setting screen (the operation screen 311).

On the layout setting screen (the operation screen 311), the user can select a desired layout. In step S502, the CPU 102 determines whether the OK key (the input key 214) is pressed by the user.

If the CPU 102 determines that the OK key (the input key 214) is pressed by the user (YES in step S502), the processing proceeds to step S503. In step S503, the layout selected by the user on the layout setting screen (the operation screen 311) is set as the setting value of the layout.

In step S504, the LCD 219 displays the read size setting screen (the operation screen 312). On the read size setting screen (the operation screen 312), the user can select a read size of the document. In step S505, the CPU 102 determines whether the OK key (the input key 215) is pressed by the user.

If the CPU 102 determines that the OK key (the input key 214) is pressed by the user (YES in step S505), the processing proceeds to step S506. In step S506, the read size selected by the user on the read size setting screen (the operation screen 312) is set as the setting value of the read size.

In step S507, the LCD 219 displays the setting size confirmation screen (the operation screen 313). In step S508, the CPU 102 determines whether the start key (the input key 220 or 221) is pressed by the user.

If the CPU 102 determines that the start key (the input key 220 or 221) is NOT pressed by the user (NO in step S508), the processing returns to step S508. If the CPU 102 determines that the start key (the input key 220 or 221) is pressed by the user (YES in step S508), the processing proceeds to step S509. In step S509, according to the set layout and read size, and the size of paper of an output destination, the integration copy is started. After step S509, the processing procedure ends.

In the present exemplary embodiment, the size of the paper of the output destination is determined based on the size of the paper set in a sheet cassette (not illustrated) by setting the predetermined sheet cassette to be used by the user.

Returning to step S502, if the CPU 102 determines that the OK key (the input key 214) is not pressed by the user (NO in step S502), the processing proceeds to step S510. In step S510, the CPU 102 determines whether the start key (the input key 220 or 221) is pressed by the user.

If the CPU 102 determines that the start key (the input key 220 or 221) is not pressed by the user (NO in step S510), the processing returns to step S502. If the CPU 102 determines that the start key (the input key 220 or 221) is pressed by the user (YES in step S510), the processing proceeds to step S511. In step S511, the layout selected by the user on the layout setting screen (the operation screen 311) is set as the setting value of the layout.

In step S512, the predetermined default size set to the image forming apparatus 100 is set as the setting value of the read size, and the processing proceeds to step S509. In step S509, the integration copy is started.

Returning to step S505, if the CPU 102 determines that the OK key (the input key 214) is not pressed by the user (NO in step S505), the processing proceeds to step S513. In step S513, the CPU 102 determines whether the start key (the input key 220 or 221) is pressed by the user.

If the CPU 102 determines that the start key (the input key 220 or 221) is not pressed by the user (NO in step S513), the processing returns to step S505. If the CPU 102 determines that the start key (the input key 220 or 221) is pressed by the user (YES in step S513), the processing proceeds to step S514. In step S514, the read size selected by the user on the read size setting screen (the operation screen 312) is set as the setting value of the read size. Then, the processing proceeds to step S509, and the integration copy is started.

In the present exemplary embodiment, as illustrated in the read size setting screen (the operation screen 312), in the processing in step S514, the user employs the read size that is being selected as the read size set by the user. If no read size is being selected on the read size setting screen (the operation screen 312), in step S514, the predetermined default size set to the image forming apparatus 100 can be set as the setting value of the read size.

As described above, according to the present exemplary embodiment, in performing the integration copy, the user can switch the normal input mode and the simple input mode in the integration copy depending on the object.

If the user surely wants to obtain an intended printing result, the user can perform the integration copy in the normal input mode in which the input operation of the setting items necessary for the integration copy and the checking operation of the settings cannot be omitted. Meanwhile, if the user wants to omit the input operation of the setting item and finish the input operation soon, or wants to simplify the input operation, the user can perform the integration copy in the simple input mode.

In the present exemplary embodiment, in performing the integration copy in the simple input mode, even if the user presses the start key (the input key 220 or 221) during the setting (for example, the operation screen 311 or 312) for performing the integration copy, the integration copy can be performed.

Especially, in the case where the start key (the input key 220 or 221) is pressed on the operation screen 311, even if the setting item (in the present exemplary embodiment, the read size of the document) to be set on the subsequent operation screen is not set by the user, the integration copy can be performed.

For the user, in performing the integration copy in the simple input mode, the input of the setting item (in the present exemplary embodiment, the read size of the document) necessary for the integration copy can be omitted, and consequently, the input operation of the setting item to be performed by the user can be reduced.

In the present exemplary embodiment, the example of the integration copy as the copy function has been described. In the descriptions, as the settings necessary for the integration copy, the layout is used as a first setting value, and the read size of the document is used as a second setting value. However, the setting values according to the present invention are not limited to the values in the present exemplary embodiment. As long as the copy function can be performed, any setting value can be used in the present invention.

The exemplary embodiments of the present invention can be implemented by executing the following processing. That is, software (program) to implement the functions of the above-described exemplary embodiments is supplied to a system or apparatus via a network or various storage media. A computer (or CPU or micro processing unit (MPU)) of the system or apparatus reads out and executes the program. In an example, a computer-readable medium may store a program that causes an image forming apparatus to perform a method described herein. In another example, a central processing unit (CPU) may be configured to control at least one unit utilized in a method or apparatus described herein.

While the present invention has been described with reference to present exemplary embodiments, it is to be understood that the invention is not limited to the disclosed present exemplary embodiments. The scope of the following claims is to be accorded the broadest interpretation so as to encompass all modifications, equivalent structures, and functions.

This application claims priority from Japanese Patent Application No. 2010-286536 filed Dec. 22, 2010, which is hereby incorporated by reference herein in its entirety.

What is claimed is:

1. An image forming apparatus comprising:
    a reading unit configured to read a document and generate image data;
    a printing unit configured to perform printing processing based on a setting specified by a user and the image data;
    a display unit configured to display a first setting screen for receiving from a user a setting of a layout used for printing the image data, a second setting screen for receiving from a user a setting of a reading size used for reading a document by the reading unit, which is displayed after displaying of the first setting screen, and a confirmation screen for confirming the layout set via the first setting screen and the reading size set via the second setting screen; and
    a controlling unit configured to, in a case where a specific operation is input by a user, allow skipping displaying of the second setting screen and the confirmation screen and shifting from displaying of the first setting screen to starting of the printing processing and allow skipping displaying of the confirmation screen and shifting from displaying of the second setting screen to starting of the printing processing and, in a case where the specific operation is not input by a user, configured to not allow skipping displaying of the screens.

2. A method for controlling an image forming apparatus, the method comprising:
    reading a document and generating image data;
    performing printing processing based on a setting specified by a user and the image data;
    displaying a first setting screen for receiving from a user a setting of a layout used for printing the image data, a second setting screen for receiving from a user a setting of a reading size used for reading a document, which is displayed after displaying of the first setting screen, and a confirmation screen for confirming the layout set via the first setting screen and the reading size set via the second setting screen; and
    in a case where a specific operation is input by a user, allowing skipping displaying of the second setting screen and the confirmation screen and shifting from displaying of the first setting screen to starting of the printing processing and allowing skipping displaying of the confirmation screen and shifting from displaying of the second setting screen to starting of the printing processing and, in a case where the specific operation is not input by a user, not allowing skipping displaying of the screens.

3. A non-transitory recording medium storing a program that causes an image forming apparatus to perform the method according to claim 2.

4. The image forming apparatus according to claim 1, wherein, in a case where the specific operation is input by a user, the controlling unit controls the printing unit to start the printing processing in response to receiving of an instruction to perform the printing processing while the first setting screen is being displayed or in response to receiving of an instruction for performing the printing processing while the second setting screen is being displayed.

5. The image forming apparatus according to claim 1, wherein, in a case where the specific operation is not input by a user, the controlling unit controls the printing unit not to start the printing processing, even if an instruction to perform the printing processing is received while the first setting screen or the second setting screen is being displayed.

6. The image forming apparatus according to claim 1, wherein, in a case where the first setting screen is displayed and displaying of the second setting screen and the confirmation screen is skipped, the reading unit reads the document based on a predetermined reading size.

7. The image forming apparatus according to claim 1, wherein the printing unit performs the printing processing based on a size of a sheet of an output destination, which is set in the image forming apparatus.

8. The image forming apparatus according to claim 1, wherein the setting of the layout is a setting of an integration print for integrating image data of a plurality of pages into one sheet.

9. The image forming apparatus according to claim 1, wherein, if a specific input key included in the image forming apparatus is pressed, the controlling unit determines that the specific operation is input by the user.

10. An image forming apparatus comprising:
a printing unit configured to perform printing processing based on a setting specified by a user;
a display unit configured to display a first setting screen for receiving from a user a first setting, a second setting screen for receiving from a user a second setting, which is displayed after displaying of the first setting screen, and a confirmation screen for confirming the first setting set via the first setting screen and the second setting set via the second setting screen; and
a controlling unit configured to, in a case where a specific operation is input by a user, allow skipping displaying of the second setting screen and the confirmation screen and shifting from displaying of the first setting screen to starting of the printing processing and allow skipping displaying of the confirmation screen and shifting from displaying of the second setting screen to starting of the printing processing and, in a case where the specific operation is not input by a user, configured to not allow to skip displaying of the screens.

11. The image forming apparatus according to claim 10, wherein, in a case where the specific operation is input by a user, the controlling unit controls the printing unit to start the printing processing in response to receiving of an instruction to perform the printing processing while the first setting screen is being displayed or in response to receiving of an instruction for performing the printing processing while the second setting screen is being displayed.

12. The image forming apparatus according to claim 10, wherein, in a case where the specific operation is not input by a user, the controlling unit controls the printing unit not to start the printing processing, even if an instruction to perform the printing processing is received while the first setting screen or the second setting screen is being displayed.

13. The image forming apparatus according to claim 10, wherein, if a specific input key included in the image forming apparatus is pressed, the controlling unit determines that the specific operation is input by the user.

14. A method for an image forming apparatus, the method comprising:
performing printing processing based on a setting specified by a user;
displaying a first setting screen for receiving from a user a first setting, a second setting screen for receiving from a user a second setting, which is displayed after displaying of the first setting screen, and a confirmation screen for confirming the first setting set via the first setting screen and the second setting set via the second setting screen; and
in a case where a specific operation is input by a user, allowing skipping displaying of the second setting screen and the confirmation screen and shifting from displaying of the first setting screen to starting of the printing processing and allowing skipping displaying of the confirmation screen and shifting from displaying of the second setting screen to starting of the printing processing and, in a case where the specific operation is not input by a user, not allowing to skip displaying of the screens.

15. A non-transitory recording medium storing a program that causes an image forming apparatus to perform the method according to claim 14.

* * * * *